United States Patent [19]
Buschur

[11] Patent Number: 5,176,107
[45] Date of Patent: Jan. 5, 1993

[54] PET LITTER

[76] Inventor: Jeffrey J. Buschur, 4068 Shadowleaf Dr., Bellbrook, Ohio 45305

[21] Appl. No.: 783,236

[22] Filed: Oct. 28, 1991

Related U.S. Application Data

[63] Continuation-in-part of Ser. No. 618,467, Nov. 27, 1990, abandoned, which is a continuation of Ser. No. 383,404, Jul. 24, 1989, abandoned.

[51] Int. Cl.$^5$ .............................................. A01K 1/01
[52] U.S. Cl. .................................. 119/173; 119/172; 119/171
[58] Field of Search ...................... 119/171, 172, 173

[56] References Cited

U.S. PATENT DOCUMENTS

| | | | |
|---|---|---|---|
| 4,607,594 | 8/1986 | Thacker | 119/172 |
| 4,685,420 | 8/1987 | Stuart | 119/173 |

FOREIGN PATENT DOCUMENTS

| | | | |
|---|---|---|---|
| 3644826 | 7/1987 | Fed. Rep. of Germany | 119/172 |
| 94043 | 5/1985 | Japan | 119/173 |
| 239932 | 10/1987 | Japan | 119/173 |
| 185323 | 7/1988 | Japan | 119/173 |
| 219323 | 9/1988 | Japan | 119/171 |
| 1085025 | 3/1989 | Japan | 119/171 |
| 8303255 | 9/1983 | World Int. Prop. O. | 119/171 |
| 8600496 | 1/1986 | World Int. Prop. O. | 119/173 |

*Primary Examiner*—John G. Weiss
*Attorney, Agent, or Firm*—Donald P. Gillette

[57] ABSTRACT

A particulate material having liquid-responsive, adhesive material mixed with sorbent material in particulate form to be wet. After being wet, the adhesive material dries and causes particles that have been wet to adhere together in clumps that can easily be separated from the particles that have not been wet.

19 Claims, No Drawings

PET LITTER

This is a continuation-in-part of my copending application Ser. No. 618,467, filed Nov. 27, 1990, now abandoned which is a continuation of my application Ser. No. 383,404, filed Jul. 24, 1989 and now abandoned.

BACKGROUND OF THE INVENTION

This invention relates to pet litter containing water-activated adhesive material to bind the litter particles together when activated by liquid excreta from the pet. In particular, it relates to pet litter treated with liquid-activated adhesive material that forms clumps of good structural integrity to permit the affected material to be easily separated from litter material that has not been contaminated by pet excreta.

Many of the brands of pet litter now on the market have been treated to control odor, dust, and bacteria but not for the specific purpose of forming clumps that allow easy separation of the clumped material from the particular material that has not been in contact with the pet excreta.

When a pet deposits liquid excreta, normally urine, on a bed of untreated litter, the liquid progresses down through the particulate material and wets the particles as it comes to them. The litter is commonly said to absorb the liquid, although it may be more accurate to say that the liquid is adsorbed on the many surfaces of the particulate material. For the sake of simplicity in the following description, the words "sorption" and "sorbent", which cover both, will be used. The force of adhesion causes the wetted particles to cling together to some extent, but this force is not very strong and it substantially entirely disappears when the liquid evaporates. As a result, there is little or no clumping effect, and the only way to be certain of getting rid of litter that has been affected by the urine, is to dispose of the entire tray of litter. While this need not be done after every use by the pet, it is usually done by pet owners at least about once a week in order to avoid the build-up of obnoxious odors in the vicinity of the litter tray.

Even litter that has odor-controlling material in it, must be disposed of every few days. Since there is no way of separating litter that has come in contact with the pet urine from litter that has not, it is common to throw away the entire contents of the litter tray and to replace it with a new bed of litter. This means that a considerable quantity of litter will be used, and a recent study indicated that pet owners typically use about 15 kg of pet litter per month. Not only is there a constant expense involved in replacing litter so frequently, there is also a considerable problem of disposing of the used material, particularly by pet owners who live in apartments or who, for any reason, are unable to remove the used litter to an acceptable disposal location.

OBJECTS AND SUMMARY OF THE INVENTION

The principal object of this invention is be able to separate out litter that has been contaminated by liquid excreta from pets from a mixture of that litter with litter that has not been thus contaminated.

Another object is to achieve such separation easily by mechanical means.

A further object is to provide pet litter that includes non-toxic adhesive material to form clumps that have good structural integrity when activated by liquid in excreta from pets. Good structural integrity means that the clumps do not easily break apart when being removed from litter that remains in particulate form due to never having come in contact with liquid excreta from pets.

In accordance with this invention, a suitable non-toxic, urine-activated adhesive material is mixed with the basic particulate litter material, which is commonly a clay, such as southern bentonite, in proportions to form clumps of good structural integrity when contacted by liquid excreta from pets. Suitable adhesive materials include: starches, such as wheat paste; cellulosic materials, such as methylhydroxypropylcellulose (MHPC), sodium carboxymethylcellulose (CMC), methylcellulose (MC), and Metylan Cellulose; and mixtures of the foregoing materials with each other and with gums, such as gum arabic.

The adhesive material is mixed as a dry powder with the powdered, or particulate, litter material to produce a coating of the adhesive material on all of the particles of litter material. This assures that any particle of litter material that comes into contact with liquid from the pet will have adhesive material on that particle to be activated by the liquid and to bond that particle of litter material with any other particle with which the activated adhesive comes into contact. Thus, substantially all of the wetted, adhesive-coated litter particles will bind together in a clump of sufficient size and structural integrity to be easily separated by mechanical means from the unaffected particulate material that has not been wet. One form of mechanical means is a hand-held scoop, but other mechanical means can also be used.

DETAILED DESCRIPTION OF THE INVENTION

A wide variety of commercial pet litters have been tried, including a premium white grade of clay, several gray clays, and a dark gray generic clay. Most of the litter material is finely ground, but I have also found that litter material in the form of tiny pebbles, which may be referred to as agglomerated material, is also satisfactory. While white clay is the preferred litter material, the gray and dark gray clays are also satisfactory.

A number of factors would determine which brand and type of pet litter would be best for commercial use in the product of this invention. Economic considerations naturally rank high. Other factors include odor control, clump mass per unit wetting, dust control, and the strength and toughness of the clumps.

Odor control is of distinct benefit. Some litters currently on the market use a perfume on the litter; others incorporate the odor-controlling material in microcapsules. Odor protection is more crucial in high-humidity environments. In low humidities, the mixtures exude only a scant odor after more than a month of use if the mechanical cleaning procedure is executed every couple of days. If left unused, this mechanically cleaned litter will completely lose its odor after several days, indicating that the odor was generated by airborne permeation rather than direct contamination by the waste. Deodorized litters are meant to mask the strong odors generated by large quantities of waste left for a dozen or more days, and thus the deodorant materials provide more masking power than is required when the odor-producing pet excreta is removed every few days, as the present invention makes possible. Even so, they are helpful. I have found it beneficial to add about 1% to 10%, by weight, of baking soda for odor reduction (low pH) to adhesives in the range of about 0.1% to about 25%, by weight, of the total mixture.

The adhesive added to the litter material must meet several, main requirements: it must be activated by pet urine and liquid in other forms of pet excreta, it must bond with the litter material, and it must not be toxic. It is also important that the adhesives be cost-effective and that they have good shelf life. While pet urine contains chemicals other than water, water is the main constituent, and by tests, I have found that there is not much difference between water and pet urine in initiating the clumping action toward which this invention is directed.

Many types of water-activated adhesives can be employed to accomplish the clumping function with litter material that takes up liquid. They can be categorized into starches, cellulose, and gums.

Of the starches, I have found that wheat paste, when used in the ratio of at least about 2% to about 25%, by weight, relative to the mixture of adhesive and litter material, is quite satisfactory. Preferably, the ratio of wheat paste to the total mixture should be about 8% to about 14%. Wheat paste is a pre-gelatinized starch that does not require the heating and swelling processes that must be carried out on raw starches prior to bonding them to the litter material. However, for optimum performance, wheat paste requires generally larger percentages of adhesive in the mixture of adhesive and litter material than do some other adhesives. Also, clumps formed of litter material mixed with wheat paste require several hours to harden fully, although they harden sufficiently in an hour to be easily separable from litter material that has not been wet.

A large family of suitable adhesives is derived from processes involving various forms of vegetable cellulose. These materials are more expensive per pound than wheat paste, but the quantity of a vegetable cellulose adhesive that must be used is much smaller than the quantity of wheat paste to achieve equal clumping action. The processed cellulosic adhesives are further modified by addition of other substances, usually inorganic substances, to meet specific application needs. I have found several cellulosic adhesives to be particularly satisfactory, including: methylhydroxypropylcellulose (MHPC), sodium carboxymethyl-cellulose (CMC), and methylcellulose (MC). These materials are sold by the Aqualon Division of Henkel-Hercules Company. I found that CMC is the most effective cellulose material, but another cellulose product, also manufactured by Aqualon but distributed by Conros Adhesives of Michigan as a high-strength wallpaper adhesive under the trade name Metylan Cellulose, is quite effective, with a performance roughly equivalent to CMC. Satisfactory clumps can be produced using a mixture of clay litter and either CMC or Metylan Cellulose in a mixture which the weight of the adhesive is at least about 0.1% of the total weight. Increasing the amount of these adhesives beyond 10% of the total weight produces little or no further improvement in clump-forming ability, and preferably, the weight of these adhesives should be between 0.7% and 2.65%.

MC is the second most effective adhesive and forms satisfactory clumps when mixed with the clay litter material when the weight of MC is in the range of about 0.1% to about 10%, or, preferably, between about 0.7% and 2.65%, of the total weight of the mixture of adhesive and litter. MHPC is somewhat less effective but is still satisfactory in the range of about 0.1% to 10%, or, preferably, between about 0.7% and 2.65%, of the total mixture weight.

Several gums have been tried with less success than the cellulose materials. Tamarind gum has characteristics that make it satisfactory as an adhesive, but its shelf life is not as good as desired. Gum arabic was tried as a substitute for tamarind, but the results were poor.

I have found that the dry, powdered, adhesive material can best be mixed with dry litter material by first mixing some of the adhesive material with a small amount of litter material, preferably in a ratio of adhesive-to-litter that is about 10 times the final ratio of adhesive-to-litter material. This distributes the fine particles, or granules, of litter material more evenly in the mixture and avoids forming regions that consist almost entirely of adhesive and other regions that contain almost no adhesive. The two-stage mixing process is particularly advantageous in the case of cellulosic adhesives since they are used in much smaller quantities than is wheat paste. After vigorous mechanical agitation, the rest of the litter material is added, and the mixture is again vigorously shaken to allow the adhesive powder to coat the litter particles or granules fully.

One of the tests I made was to measure the clump mass per unit volume of the water used in forming the clump. This is relevant and important because, the larger the clumps for a given volume of liquid, the more litter material will be used up as the result of each usage of the litter tray by a pet. However, large clumps can be more easily separated from unclumped material than smaller clumps can.

In the clump size test, the following results were obtained:

Water Tests

TABLE 1

| Adhesive Type | Litter Type | Clump Mass (gm) per gm. water |
| --- | --- | --- |
| Wheat paste | White premium | 2.18 |
| Wheat paste | Dark gray generic | 2.54 |
| Metylan Cellulose #1 | Gray #1 | 2.64 |
| Metylan Cellulose #1 | White premium | 3.13 |
| Metylan Cellulose #1 | Gray #2 | 3.19 |
| Metylan Cellulose #1 | Gray #3 | 2.25 |
| Metylan Cellulose #2 | Gray #1 | 2.12 |
| Metylan Cellulose #2 | White premium | 2.76 |
| Metylan Cellulose #2 | Gray #2 | 2.15 |
| CMC | White premium | 1.96 |
| Metylan Cellulose #2 | Gray #1 | 2.03 |

(37 gms. per clump)
Metylan Cellulose #1 = Special Vinyl Conros Wallpaper Paste
Metylan Cellulose #2 = Metylan Cellulose Prof. Paste In this test, the white premium clay to which CMC had been added as a water-activated adhesive was the most efficient in that less litter was used in forming a clump with a given weight of water.

In forming each clump, 37 gms. of water were used since I had determined from separate tests in a litter box that the clumps formed by cat urinations averaged out to about the same size as clumps formed by approximately 37 gms. of water.

Water was used in most of the experiments. Where a correlation was made with cat urine, the results were close enough to validate the water tests.

Clump strength, or structural integrity, is of primary importance since it determines how well clumps can be mechanically separated from particles. I have employed several methods of measuring clumps in efforts to quantify this parameter: by hardness, toughness, and subjective clump integrity ratings.

All of these qualities are important in forming clumps that do not fall apart or shatter when the bed of litter is raked or otherwise shifted around to separate the clumps from the litter that has not been wetted. Three test methods were used to check different formulations of litter and adhesive with respect to these qualities. These test methods are:

Test Method #1—Subjective Rating

A quantity of water, 37 gms., was added to the mixture of adhesive and litter materials to form clumps, and clump tensile strength was evaluated on a scale of 1-5 (5 being highest) by judging subjectively how difficult it was to pull each clump apart by hand. The stronger the clump, the higher the value.

Test Method #2—Clump Toughness

A quantity of water, 37 gms., was added to the mixture of adhesive and litter material and the resulting clump was weighed. The clump was then dropped from 30 cm. onto a grid of 3/16" wooden dowels that were approximately 45 cm. long and were spaced 6 mm. apart. The mass remaining above the grid was then reweighed and that weight divided by the original weight to obtain a percentage representative of the toughness of the clump.

Test Method #3—Clump Hardness

The clump mass, generally measuring about 60 mm. diameter in roughly spherical form, was set on a scale. The side of a 3/16" dowel that extended parallel to the scale platform was forced down against the uppermost surface of the clump until a general split or collapse of the clump occurred. As the pressure on the clump increased, the scale reading increased as if more weight were being put on the platform. The maximum reading registered on the scale minus the clump weight (in oz.) was considered to be representative of the hardness value.

Table 2 summarizes my findings on the strength of clumps formed with different constituents and tested by the three foregoing tests:

TABLE 2

Clump Strength Summary

| Adhesive Type | Type Litter | Test Method | Avg. Value |
| --- | --- | --- | --- |
| (CMC & MC in various ratios) | Gray #1 | 1 | 1.5 |
|  | White premium | 1 | 3.5 |
| (Metylan Cellulose #2 various ratios) | Gray #1 | 2 | 91.1% |
|  | White premium | 2 | 92.0% |
| (Metylan Cellulose #2 various ratios) | Gray #2 | 2 | 90.6% |
|  | Gray #3 | 2 | 86.8% |
| (Metylan Cellulose #1 various ratios) | Gray #1 | 2 | 89.7% |
|  | White premium | 2 | 93.0 |
| (Metylan Cellulose #1 various ratios) | Gray #2 | 2 | 89.0 |
| (Metylan Cellulose #1 various ratios) | Gray #3 | 2 | 78.3 |
| (Wheat paste at various ratios) | Dark gray generic | 2 | 77.8 |
|  | White premium | 2 | 85.6 |
| (Wheat paste 6-25% ratios) | Dark gray generic | 3 | 6.04 oz. |
|  | White premium | 3 | 10.04 oz. |

The majority of the data and derived conclusions were based on a designed experiment approach specifically employing Taguchi fractional factorial matrices. These procedures show whether average differences observed between variables are the result of chance or are statistically significant. In addition, the procedures determine whether the effect is present in the global sense or just at that particular level of the other variables involved.

Several tests were conducted by wetting untreated litter with 37 gms. of water to determine the clumping ability of litter without any clumping adhesive present. All results showed near zero readings on all three test measurements employed. This was consistent with the assumption that, in the absence of a specific adhesive, the only thing holding the grains together was the force of adhesion between the grains and the water. When the water evaporated, this small force disappeared.

Mixtures of various percentages of CMC with white premium litter in which CMC constituted between about 1% and about 10% of the total weight of the mixture were tested for clump toughness by test method #2. Some of the tests were performed about 1 hour after water was added to the dry mixture and other tests, using the same method #2, were performed about 72 hours after the water was added. The results showed an average toughness value of about 93%.

Mixtures of Metylan Cellulose #2 and white premium litter in which the weight of the Metylan Cellulose constituted between about 1% and about 10% of the weight of the total mixture were tested for clump toughness by test method #2 and yielded average toughness values of 86-97%. However, when the amount of Metylan Cellulose was reduced so that it constituted only about 0.6% of the mixture, the result obtained by applying test method #2 dropped sharply to about 49%, which compared poorly with the toughness value at 1% of the total weight. The cost of the cellulosic adhesives makes it inadvisable to go above 10%, and, in fact, I have found that 2.65% is a perfectly satisfactory maximum weight of these adhesives in comparison with the total weight of the product comprising litter material and the adhesive.

Four sets of tests were run to determine the effects of varying the components, procedures, and times. The test variables, the parenthetical explanatory remarks, and the conclusions drawn from the test are described next.

First Set of Tests

Wheat paste was the only adhesive used in this test.

Test Variables

Stratification of mixture; (by dropping a container of the dry mixture of adhesive and litter 20 times vs. not dropping it at all)

Mixture wetting; (using no water vs. using an extremely low mist while mixing adhesive with litter)

Ratio of weight of wheat paste to total weight of mixture; (6%, 8%, 12%, 25%)

Fines; (fines removed by passing the mixture across a plate having a 2.65 mm. gap to sieve the mixture vs. not sieving it)

Depth of bed of litter in litter tray; (having a deep bed of 4-5" vs. having a shallow bed of 1-2")

Litter Type; (white premium vs. dark gray generic)

Sample size, or quantity of water/clump; (large sample based on 36 gms. of water vs. small sample based on 10 gms. of water, corresponding to the fact that pets do not expel the same amount of urine each time)

Results

These clumps were tested for hardness using test method #3 with readings given in oz.

(a) A first series of such tests was performed about 1 hour after adding the water. The results were:
  Overall average 8.04.
  White premium litter was 10.04 vs. 6.04 for dark gray generic.
  Tests made with litter from which fines had been removed yielded a value of 10.58 vs. 5.50 as packaged.
  With stratification gave 9.58 vs. 6.50 without.

(b) A second series of tests run after the material had had about 11 hours to harden gave the following results:
  Overall average was 26.70.
  White premium litter was 34.7 vs. dark gray generic value of 18.7.
  With stratification was 31.3 vs. 22.10 without.
  Small sample size yielded a value of 35.5 vs. 17.91 for the large sample.
  Shallow bed 30.6 vs. 22.83 deep bed.
  An interaction was noted between container depth and sample size.
  All other variables were insignificant.

Conclusions

The results of this set of test showed that white premium clay litter produced harder clumps than dark gray generic and that removing the fines may have eliminated particles of litter so small that they had no adhesive on them. The stratification results showed that the jouncing expected to be encountered when containers of mixture are shipped does not have an adverse effect on clump hardness and is even somewhat beneficial.

The difference between the results after 11 hours as compared with those after 1 hour showed that clumps formed with wheat paste as the adhesive grew harder with time. In addition, the use of a deep bed of litter was somewhat preferable to using a shallow bed.

Second Set of Tests

Wheat paste was the only adhesive used in this set of test.

Test Variables

Stratification; (by dropping a container of dry, mixed adhesive and litter 20 times vs. not dropping it at all)
Ratio of the weight of wheat paste to the total weight of the mixture of adhesive and litter; (6%, 8%, 12%, 25%)
Fines; (fines removed by being sieved through a 2.65 mm. gap vs. fines not being removed)
Litter type; (white premium vs. dark gray generic)
Amount of water used per clump; (36 gms. vs. 10 gms.)

Results

The samples in this set of test were checked for toughness by test method #2 two hours after putting the water in the dry mixture. The only significant variable in these samples was the ratio of the weight of wheat paste to the total weight of the mixture.

| Ratio of weight of wheat paste to total weight | Weight of clump remaining on grid as percent of initial clump |
| --- | --- |
| 6% | 64% |
| 8% | 70% |
| 12% | 75% |
| 25% | 88% |

Conclusions

While there is some increase in the toughness of the clumps with an increase in the amount of wheat paste, increasing the amount of wheat paste to four times the original value increased the toughness by only 40%.

Third Set of Tests

Wheat paste was the only adhesive used in this set of tests.

Test Variables

Time from wetting to measurement; (2.5 hrs. vs. 8 hrs.)
Litter type; (white premium vs. dark gray generic)
Amount of wheat paste in the mixture; (either: (1) a quantity of wheat paste far in excess of 14% of the total mixture was vigorously mixed with the litter material and then the mixture was sieved to remove excess wheat paste, the particles of which were much smaller than particles of the litter material; or (2) an amount of wheat paste approximately equal to 14% of the total weight of the mixture was used. The first is identified as "excessive and sieved" and the second "14% paste".)

Results

The foregoing samples were checked for toughness by test method #2 with the following results:
  Overall average was 80.43%.
  White premium litter was 87.1% vs. 78% for dark gray generic litter. 14% paste was 92.7% vs. 73% for excessive and sieved paste.
  Other variables were insignificant.

Conclusions

This set of tests showed that white premium litter was somewhat better than dark gray generic litter and that using an excessive amount of wheat paste was not as satisfactory as using 14%.

Fourth Set of Tests

Test Variable

Ratio of adhesive weight to total weight of the mixture; (0.7%, 1.35%, 2.0%, 2.65%)
Adhesive type; (CMC vs. MC)
Litter type; (gray #1 vs. white premium)

Results

Based on using toughness test method #2 two hours after water had been applied to the mixture, the average toughness value for CMC was 91% and for MC was 81%.

At the following ratios of the weight of the adhesive to the weight of the total quantity of the mixture, the values were:

|  | .7% | 1.35% | 2.0% | 2.65% |
| --- | --- | --- | --- | --- |
| MC | 79% | 89% | 65% | 92% |

-continued

|  | .7% | 1.35% | 2.0% | 2.65% |
|---|---|---|---|---|
| CMC | 90% | 92% | 91% | 94% |

Based on using test method #1 to test the tensile strength of the clumps, the following values were determined:

For white premium, the value was 3.5 vs. 1.5 for Gray #1.

For CMC, the value was 3.0 vs. 2.25 for MC.

At the following ratios of the weight of the adhesive to the weight of the total quantity of the mixture, the values were:

|  | .7% | 1.35% | 2.0% | 2.65% |
|---|---|---|---|---|
| MC | 2.7 | 1.7 | 1.7 | 3.0 |
| CMC | 2.0 | 4.5 | 3.8 | 1.6 |

Conclusions

The clumps produced when CMC is the adhesive are somewhat tougher than those produced using MC. When the weight of the adhesive is between about 0.7% and 2.0% of the total weight of the mixture, the tensile strength of clumps made from a mixture that had CMC as the adhesive component was greater than that of clumps made from a mixture that contained MC.

Overall, the most satisfactory mixtures have been:

(1) White cat litter material and common wheat paste adhesive material in powdered form mixed together as a dry mixture by vigorous mechanical agitation, with the weight of the adhesive material being between about 11% and 14% of the total weight of the mixture;

(2) Premium white cat litter material in a dry mechanical mixture with CMC or MC as an adhesive material in powdered form and constituting about 1.2% to about 1.4% of the weight of the total product, including the litter material and the adhesive material. In the case of MC, it is preferable, but not necessary, to use a high molecular weight CMC; and (3) Premium white grade or other cat litter in mechanical mixture with about 2.5% by weight of Metylan Cellulose.

Using these mixtures and mechanically cleaning clumps out of the litter tray each day resulted in usage of about 2 kg., or less, per month of the mixture per cat as compared with a mean of about 15 kg. per month determined by a recent survey of cat owners. The specific amounts of my product used in a household having two cats is shown in Table 3.

TABLE 3

| | Litter Box Trials | |
|---|---|---|
| Adhesive Type | Litter Type | gms./day usage |
| Metylan Cellulose #2 | White premium | 95.3 |
| Metylan Cellulose #2 | Gray #1 | 113.5 |
| Wheat Paste | White premium | 131.7 |
| CMC | White premium | 100.0 |

The amount of litter used per day was also determined by another series of tests on numerous types of clay litter mixed with varying percentages of adhesives. These tests were conducted in actual litter box usage by two adult cats weighing about 10 lbs., each. For each formulation of litter material, the response variable measured was the weight loss in litter per day. The clumps were carefully scooped out to make their removal uniform. Assuming that the cat excretion was also constant, the loss of weight of the litter material would be an indication of the clumping performance of the adhesive. It was expected that the weight of the litter tray would increase each day due to the addition of excreta, although some loss would be expected to occur due to evaporation and to the amount thrown out by the cats during use of the tray. Removal of the clumps formed by reason of the adhesive would be the major cause of loss of weight of the litter material in the tray, and a measure of the weight lost was made to determine the effectiveness of removal of the urine via the clumps. The number of clumps found and their general integrity were also determined.

Table 4 summarizes these tests. Hartz Mountain Corp. cat litter was used in tests A, C, E, and F. Test B was made with white Georgian clay supplied by Georgia Tennessee Mining Co., a subsidiary of Hartz Mountain Corp. Other commercially available floor sorbents were used in tests G-I. Test H was made using a clumping clay cat litter marketed by Oil-Dri Corp. It is not known to contain any additives and therefore relies on moisture-related adhesion for clump strength. Tests indicated that, although it presented a removable clump following liquid application, the clump was substantially too weak, or was nonexistent, for removal after a day's period of time.

Tests C-F depict decreasing adhesive concentrations, with litter mass dropping to $-1.30$ lbs/day, i.e., a gain in weight due to accumulation of urine, when no adhesives were employed. Even as little as 0.14% CMC can be seen to have a positive effect on clump formation, resulting in a loss of $-0.072$ lbs./day.

Clump size, quantity, and quality were also recorded, indicating that even when the weight percentage of the adhesives relative to the total weight of the litter and adhesive mixture was as low as 0.14%, some beneficial effect was obtained by having the adhesives in the litter material.

TABLE 4

| | Type litter | % Adhesive | Lbs. lost per day | Avg. # clumps per day | Avg. oz. per clump | % sub-st'd'd clumps | Avg # days betw. clean. | Duration of test (days) |
|---|---|---|---|---|---|---|---|---|
| A | Hartz | 1% CMC 2% WP 7% Baking Soda | .37 | 3.2 | 1.85 | 6.2% | 2.5 | 15 |
| B | Floor Absorbent, Georgia Tenn Mining | 1% CMC 2% WP | .31 | 3.8 | 1.85 | 3.7% | 2.3 | 16 |
| C | Hartz | 1% CMC 2% WP | .23 | 3.0 | 1.21 | 26% | 2.1 | 36 |
| D | Hartz | 0.3% CMC | .028 | 2.2 | 0.20 | 34% | 2.9 | 17 |
| E | Hartz | 0.14% CMC | −.072 | 0.57 | N/A | 50% | 2.8 | 14 |
| F | Hartz | No Adhesive | −.130 | 0 | N/A | N/A | 2.5 | 10 |
| G | Floricon X | 1% CMC 2% WP | .23 | 3.61 | 1.02 | 41% | 1.6 | 16 |

TABLE 4-continued

| Type litter | % Adhesive | Lbs. lost per day | Avg. # clumps per day | Avg. oz. per clump | % sub-st'd'd clumps | Avg # days betw. clean. | Duration of test (days) |
| --- | --- | --- | --- | --- | --- | --- | --- |
| H Floridon Co. Lasting Pride | No Adhesive | 0* | N/A | N/A | 100% | 1.25 | 5 |
| I Absorball K Absorbent Sales. Inc. | 1% CMC 2% WP | .083 | 3.66 | .36 | 50% | 1.50 | 6 |

*It was found at each time of cleaning that all clumps had disintegrated. However, clumps were observed to exist for a limited period of time after the cats urinated.
CMC = Aqualon-Sodium Carboxymethylcellulose Type 7H3SFX
Tests conducted with 2 cats. 10 lbs. each The same ratio of adhesive to litter was used in the litter material in both test A and test C, but in test A, the litter material also contained 7%, by weight, of baking soda. Comparison of these tests shows that both the weight loss and the clump size are substantially higher with the baking soda than without it, indicating that the use of baking soda is beneficial in clump formation. It is also beneficial in odor reduction.

The overall conclusion to be drawn from the test results in Table 4 is that adhesives, even in amounts that are nearly immeasurable, have a beneficial effect on forming clumps in response to liquid excreta from pets, but that the preferred amount of adhesive, as a percentage of the total weight of the litter material, should be at least a large fraction of one percent.

What is claimed is:

1. A clumping litter product for pets, said product comprising:
   (a) particulate, sorbent litter material;
   (b) non-toxic, urine-activated, adhesive material mixed with the particles of the litter material to join together those of the particles activated by urine from pets, the weight of adhesive material being in the range of about 0.1% to about 25% of the total weight of the product; and
   sodium bicarbonate in the range of about 1% to about 25% of the total weight of the product.

2. A particulate, clumping litter product for pets, said product comprising:
   (a) particulate, sorbent litter material; and
   (b) non-toxic, urine-activated, particulate adhesive material mixed with the particles of the litter material, substantially each of the particles of litter material having particles of adhesive material on the surface thereof to bind together only those of the particles of litter material jointly in contact with such of the adhesive material as is activated by urine from pets, the adhesive material being a starch and comprising about 2% to about 14% of the weight of the litter.

3. The clumping litter product of claim 2 in which the starch is a pre-gelatinized starch.

4. The clumping litter product of claim 3 in which the starch is wheat paste.

5. The clumping litter product of claim 4 in which the wheat paste constitutes less than 5%, by weight, of the litter product.

6. A particulate, clumping litter product for pets, said product comprising:
   (a) particulate, sorbent litter material; and
   (b) non-toxic, urine-activated, particulate adhesive material mixed with the particles of the litter material, substantially each of the particles of litter material having particles of adhesive material on the surface thereof to bind together only those of the particles of litter material jointly in contact with such of the adhesive material as is activated by urine from pets, the adhesive material being a cellulosic product and the weight of adhesive material being less than about 25% of the total weight of the product.

7. The clumping litter product of claim 6 in which the adhesive material comprises a cellulose adhesive.

8. The clumping litter product of claim 6 in which the weight of the adhesive material is at least 0.7% of the total weight of the mixture.

9. The clumping litter product of claim 8 in which the weight of the adhesive material is at least 10% of the total weight of the mixture.

10. The clumping litter product of claim 9 in which the weight of the adhesive material is at least 3% of the total weight of the mixture.

11. The clumping litter product of claim 8 in which the adhesive material comprises at least about 0.1%, by weight, of the cellulose adhesive and at least about 2% by weight of wheat paste.

12. A particulate, clumping litter product for pets, said product comprising:
   (a) particulate, sorbent litter material; and
   (b) non-toxic, urine-activated, particulate adhesive material mixed with the particles of the litter material, substantially each of the particles of litter material having particles of adhesive material on the surface thereof to bind together only those of the particles of litter material jointly in contact with such of the adhesive material as is activated by urine from pets, the adhesive material comprising a material selected from the group consisting of methylhydroxypropylcellulose, methylcellulose, sodium carboxymethylcellulose, and Metylan Cellulose and the weight of adhesive material being less than about 25% of the total weight of the product.

13. The clumping letter product of claim 12 in which the adhesive material is sodium carboxymethylcellulose and weighs between about 0.1% and 3% of the combined weight of the adhesive and litter.

14. The clumping litter product of claim 13 in which the adhesive material comprises about 1% to about 3%, by weight, of sodium carboxymethylcellulose and between about 2% and 5%, by weight, of wheat paste.

15. The clumping litter product of claim 12 in which the adhesive material is Metylan Cellulose and weighs between about 0.7% and 3% of the combined weight of the adhesive and litter.

16. The clumping litter product of claim 12 in which the adhesive material is methylcellulose and weighs between about 0.7% and 3% of the combined weight of the adhesive and litter.

17. The clumping litter product of claim 12 in which the adhesive material is methylhydroxypropylcellulose and weighs between about 0.7% and 3% of the combined weight of the adhesive and litter.

18. A particulate, clumping litter product for pets, said product comprising:

(a) particulate, sorbent litter material; and (b) non-toxic, urine-activated, particulate adhesive material mixed with the particles of the litter material, substantially each of the particles of litter material having particles of adhesive material on the surface thereof to bind together only those of the particles of litter material jointly in contact with such of the adhesive material as is activated by urine from pets, the adhesive material comprising a mixture of at least about 0.1%, by weight, of a cellulose adhesive and at least about 2% by weight of wheat paste and the weight of adhesive material being less than about 25% of the total weight of the product.

19. The method of making a predetermined quantity of a clumping litter product that comprises a final mixture of particulate, sorbent litter and a predetermined weight percentage of powdered adhesive material, said method comprising the steps of:

(a) mixing approximately equal weights of the particulate litter and the powdered adhesive material to form a substantially uniform mixture of the adhesive material and the litter; and (b) mixing a quantity of the substantially uniform mixture with a sufficient quantity of the litter material to produce the final mixture having the predetermined weight percentage of the adhesive material.

* * * * *

UNITED STATES PATENT AND TRADEMARK OFFICE
CERTIFICATE OF CORRECTION

PATENT NO. : 5,176,107
DATED : January 5, 1993
INVENTOR(S) : Jeffrey J. Buschur

It is certified that error appears in the above-identified patent and that said Letters Patent is hereby corrected as shown below:

Column 12,
Lines 24 and 27, delete "at least" and substitute therefor -- less than --.

Signed and Sealed this

Twelfth Day of October, 2004

JON W. DUDAS
*Director of the United States Patent and Trademark Office*